United States Patent [19]

Flottmann et al.

[11] Patent Number: 4,923,608
[45] Date of Patent: May 8, 1990

[54] MICRO/ULTRAFILTRATION MEMBRANES WITH A FIXED PORE SIZE FORMED THROUGH IRRADIATION WITH PULSED LASERS AND PROCESS FOR MANUFACTURING THE SAME

[75] Inventors: Thomas Flottmann, Aschaffenburg; Joachim Tretzel, both of Aschaffenburg, Fed. Rep. of Germany

[73] Assignee: Akzo N.V., Arnhem, Netherlands

[21] Appl. No.: 285,113

[22] Filed: Dec. 16, 1988

[30] Foreign Application Priority Data

Dec. 17, 1987 [DE] Fed. Rep. of Germany ....... 3742770

[51] Int. Cl.$^5$ .................... B01D 13/00; B01D 13/04
[52] U.S. Cl. .................. 210/500.25; 29/163.8; 210/500.26
[58] Field of Search ........... 210/500.1, 500.21, 500.25, 210/500.26; 264/41; 29/163.8

[56] References Cited

U.S. PATENT DOCUMENTS

| | | |
|---|---|---|
| 3,303,085 | 2/1967 | Price et al. |
| 3,612,871 | 10/1971 | Crawford et al. |
| 3,617,702 | 11/1971 | Flournoy |
| 4,032,743 | 6/1977 | Erbach et al. |
| 4,141,838 | 2/1979 | Schilling ..................... 210/500.23 |
| 4,297,559 | 10/1981 | Whitman, III |
| 4,652,412 | 3/1987 | Chiulli |
| 4,680,442 | 7/1987 | Bauer et al. |
| 4,699,637 | 10/1987 | Iniotakis et al. ................... 55/16 |

FOREIGN PATENT DOCUMENTS

| | | |
|---|---|---|
| 712434 | 9/1941 | Fed. Rep. of Germany |
| 726710 | 9/1942 | Fed. Rep. of Germany |
| 732085 | 1/1943 | Fed. Rep. of Germany |
| 2040140 | 9/1974 | Fed. Rep. of Germany |
| 2719275 | 11/1977 | Fed. Rep. of Germany |
| 2559332 | 4/1981 | Fed. Rep. of Germany |
| 3629601 | 3/1988 | Fed. Rep. of Germany |
| 7001320 | 8/1971 | Netherlands |

OTHER PUBLICATIONS

Patent Abstracts of Japan Sec. M, vol. 11, 1987, No. 74, M-568 No. 61-229492.
Le Journal de Physique 1985, No. 5, 46, pp. 883-885.

*Primary Examiner*—Frank Sever
*Attorney, Agent, or Firm*—Oliff & Berridge

[57] ABSTRACT

Flat membranes from foils of organic polymers, glass or ceramic materials have pores tapering in funnel-shaped fashion, with a fixed pore size and a pore size distribution of less than 10% and an arrangement of the pores in a pattern of adjacent rows, wherein the average pore diameters range from 0.05 to 10 μm and the pore patterns are evenly arranged in a regularly bounded area and, between the individual pores, have remaining webs with varying heights in the plane parallel to the increase in thickness of the foil material. It is manufactured through erosion of the pores by use of one or more intensity-modulated laser beams and continuous transport of the foil past the laser or lasers, with a pulse duration ranging from 1 to 1000 ns.

12 Claims, 7 Drawing Sheets

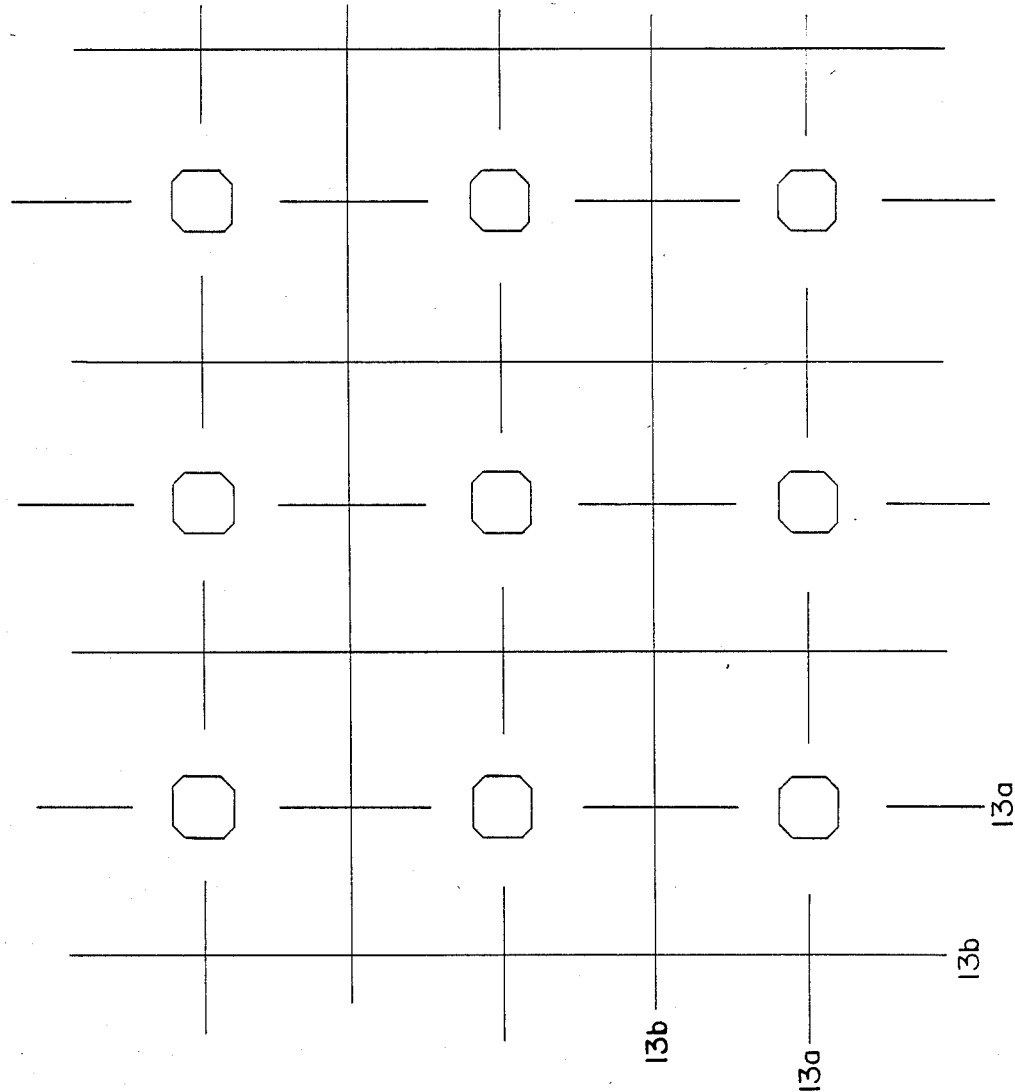

MICRO/ULTRAFILTRATION MEMBRANES WITH A FIXED PORE SIZE FORMED THROUGH IRRADIATION WITH PULSED LASERS AND PROCESS FOR MANUFACTURING THE SAME

TECHNICAL FIELD

This invention relates to a flat membrane from sheets of organic polymers, glass or ceramic materials having pores tapering in funnel-shaped fashion, with a fixed pore size and a distribution of less than 10% and an arrangement of the pores in a configuration of adjacent rows, as well as a process for manufacturing flat membranes from foils of organic polymers, glass or ceramic materials through erosion of the pores by use of one or more pulsed lasers and continuing transport of the foil past said one or more lasers.

BACKGROUND

Micro/ultra-filtration membranes with a uniform pore diameter have several advantages when compared with conventional membranes with a wide distribution of pore diameters. Materials with a diameter larger than that of the pores will be held back with assurance, while a more uniform, quicker passage is assured for materials with a smaller pore size. The fixed pore size provides, for example, interesting applications in the biomedical and biotechnical engineering fields. In dialysis, the size of the opening for the passage of solutes (e.g., electrolytes, glucose, urea, creatine, barbiturates) must be adequate, while colloids and corpuscular constituents (protein, fats, blood cells, bacteria and viruses) are to be held back. To do this, the dividing limit must be approximately at the molecular weight 60,000. A significant improvement of modern dialysis membranes can be achieved with fixed pore diameters. Specific proteins can be separated in the pore range from 50 to 4,000 nm. Even larger pores with micron dimensions are in the order of magnitude of biological cells. Therefore, appropriate membranes could be used in cancer therapy. The pore range from 50 to 10,000 nm is also suitable for separating microorganisms (bacteria and viruses).

Biotechnology also offers many applications for micro/ultrafiltration membranes with a fixed pore size. In this case, it is important that certain biologically active substances be allowed to adhere to the surface of the membrane, while the conveying medium must be able to pass freely the products thus formed. Pore sizes similar to the ones described above may be used for the biomedical application described earlier.

Previous processes for the manufacture of membranes with a fixed pore size include the mechanical stamping of foils, ion bombardment in conjunction with chemical etching, and drilling with lasers.

Coining dies for mechanical engineering are made by means of surface relief technology. Here, photosensitive material (photoresist) is exposed to laser light in order to form the desired fine patterns on the surface. Following chemical development, these patterns are available as surface structures in the photoresist. The next step is to create a metallic copy of the photoresist structures by way of galvanoplastic technology. Such a process is described in U.S. Pat. No. 4,652,412.

In another technology, high-energy ion beams are shot through polymer foils. The ions leave channels in the foil that are subsequently etched out by chemical means. The holes, while uniform in diameter, are randomly distributed over the surface. Furthermore, superposition traces will have to be sorted out under the microscope in a later step. Reference is made to U.S. Pat. Nos. 3,303,085 and 3,612,871.

Finally, individual holes can also be burned directly into foils from different materials (metal, polymer, ceramics, etc.) by means of a laser. In most cases, infrared light of $CO_2$- or Nd-YAG lasers is used. The effect is dependent upon heat generation of the focused light, which vaporizes the material at the point of impact. However, due to thermal interaction, the remaining edges of the holes are damaged, since part of the material is melted open. This process did not produce hole diameters under 1 micron. In order to be able to perforate large foils and cover the whole area at high speed, the foil will have to be moved underneath the laser beam by a complex mechanism, if the laser heads are stationary and the beam has to be pulsed, correlated with an appropriate electronic system (e.g., U.S. Pat. No. 4,032,743).

SUMMARY OF THE INVENTION

An object of this invention is to provide a flat membrane from foils of organic polymers, glass or ceramic materials, wherein as many identical pores—or optionally groups of identical pores—as possible are produced. This process is to cover as large an area as possible in a relatively short period of time. Furthermore, flat membranes are to be made available, which are distinguished by a high filtration performance with a clear separation limit.

This and other objects are achieved with a flat membrane formed from foils of organic polymers, glass or ceramic materials with pores tapering in funnel-shaped fashion, with a fixed pore diameter and a distribution of pore diameters of less than 10% and an arrangement of the pores in a configuration of adjacent rows, wherein the average pore diameters range from 0.05 to 10 micron, the pore patterns are arranged uniformly within a regularly bounded area, and webs that remain between the individual pores have varying heights in the direction of the increase in thickness of the foil material.

BRIEF DESCRIPTION OF THE DRAWINGS

FIG. 6a is a schematic of the pattern of holes produced during the crossing of fringe-like interferences and the webs which are perpendicular to each other with alternately different heights.

DETAILED DESCRIPTION OF PREFERRED EMBODIMENTS

Figure 1:
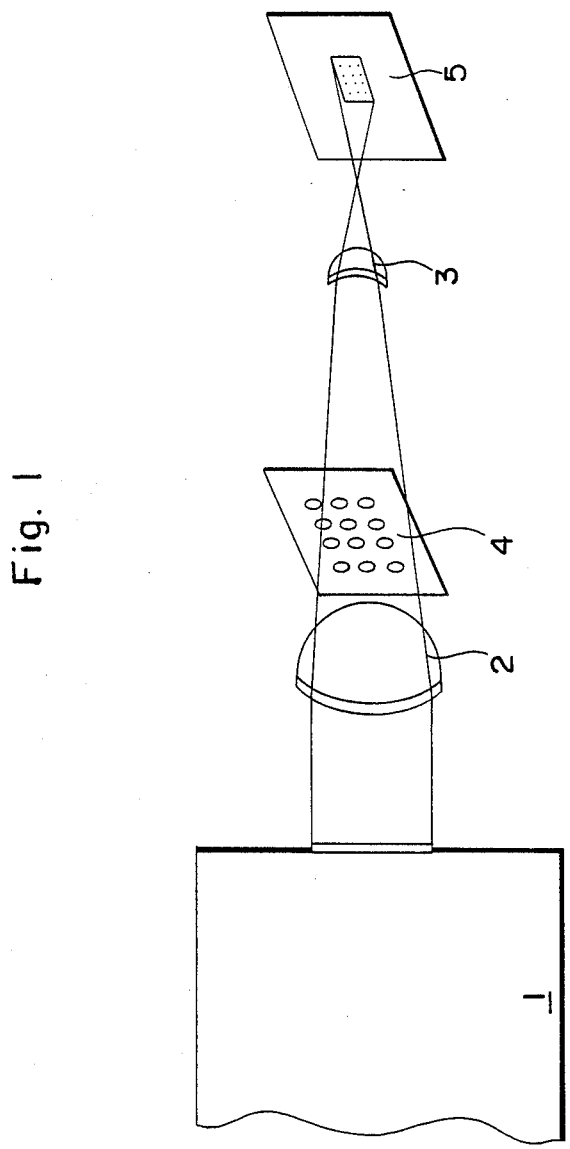
FIG. 1 is a schematic of the optical design for the erosion of a foil for which the intensity modulation is carried out by a rectangular shadow mask.

Organic polymers of interest for the invention include, for example, polyolefins, polycarbonates, polyesters, polyimides, PMMA, polyformaldehyde, polytetrafluorohydrocarbon, cellulose, and silicone rubber.

All customary types of glass may be used.

Ceramic materials which may be used for the invention include oxidic and non-oxidic ceramics, e.g., $Al_2O_3$, $Si_3N_4$.

The regularly bounded area may correspond to any geometrically bounded area. For reasons of practicality, it is preferred that the area be formed as a square, a rectangle or a circle, especially since these designs are easy to achieve in industrial processes.

The special arrangement of the webs offers special possibilities for membrane filtration, depending upon whether the membrane is acted upon from the narrow or the wide funnel side of the pores.

Deep filter-medium filtration is carried out with a relatively low solids content by acting upon the side of the membrane with the wide funnel opening and the webs with the lower height permit underwashing of the retained parts.

With higher solids contents, the membrane is acted upon from the side with the narrower funnel opening, and the protruding webs on the opposite side function as drip edges for the filtrate.

In order to increase the mechanical stability, in a special embodiment of the invention the flat membrane is installed on a coarse-pored support material. As an example, the latter may be a coarse-pored filter material from an organic polymer. However, it may also be a thin metal foil which has been provided with coarse-pored openings by galvanic means prior to or after irradiation with the laser using known technologies. Known combinations of thin organic polymer foils and thin metal foils are taught in German Offenlegungsschrift 36 29 601.

The invention also includes a process for the manufacture of flat membranes from foils or organic polymers, glass or ceramic materials through erosion of the pores by one or more pulsed lasers and continuous transport of the foil past the laser or lasers, wherein a spatially evenly intensity-modulated laser beam bounded by a regular area is pulsed onto the foil with a pulse duration of 1 to 1000 ns. With this process one can produce membranes with a fixed pore size by means of a laser.

In one embodiment of the process of the invention, an entire field of several thousand holes is drilled concurrently. A laser beam with a spatially expanded beam area is intensity-modulated therein. In this process, the spots with high intensity correspond to the holes, while the spots with low intensity correspond to the ribs that remain between the holes. For this purpose, either the grid of a metallic shadow mask is optically reduced by means of a lens system and projected with the laser onto the substrate foil, or the coherence of two laser beams is utilized to generate interference lines through superimposition. The desired hole pattern is created when interference lines that are perpendicular to one another cross over. In both techniques, the substrate foil is continually transported at low speed under the stationary laser head.

The individual hole patterns are separated on the foil from one another by fairly large distances. This increases the mechanical stability of the membrane while at the same time covering a large area. The maximum relative area fraction that can be occupied by holes is about 50% relative to the total membrane.

Material is removed by photochemical etching with pulsed lasers. Here, molecular bonds of the particular material are broken directly by photon absorption. A prerequisite is that the substrate material absorbs sufficiently strongly at the laser wavelength. The laser pulses are so short (<1000 ns) that the destroyed material leaves the surface like an explosion. The thermal interaction between the laser irradiation and the membrane material is so insignificant that adjacent, non-irradiated material is not damaged thermally. This results in distinct and smooth hole edges consisting of non-destroyed starting material. The material removed with each laser pulse can be staggered by the pulse energy and is at least 100 nm (depending upon the material).

Contingent upon the diffraction effects on material edges, the inside dimensions of the holes taper off with increasing penetration of the irradiation, producing funnel-shaped structures. In the case of the optical image formation of a shadow mask, by drawing the holes on the mask nearer in a given direction, the webs between the pores on the membrane can be lowered in this direction relative to the surface of the foil.

In the case of the process using the crossed interference lines, the successive staggered removal of material in lines at right angles to each other leads to the webs, which are arranged perpendicularly to each other, having alternately a different height in the thickness of the foil material.

The photochemical removal of material does not start until a certain threshold intensity per pulse is exceeded. This threshold intensity depends upon the material and wavelength and determines the minimal thickness of the layer to be removed. After the threshold intensity is exceeded, the layer thickness of the material removed with each pulse increases with increasing pulse energy within a non-linear context. On the whole, the layer of material D is calculated at the illuminated substrate locations as follows:

$$D = n \cdot a(I, \lambda, f, \alpha)$$

n = number of pulses
a = removed layer of thickness/pulse
I = laser intensity
f = laser frequency
$\alpha$ = absorption coefficient of the material at the laser wavelength $\lambda$ The frequency dependency stems from the light-screening effect of the ejected material fragments over the substrate surface.

The minimally achievable pore diameter is dependent upon the laser wavelength used. In the optical projection method of a shadow mask, the resolution d is given by the diffraction limit:

$$d = \lambda / 2 \cdot N$$

N = numerical aperture of the imaging optics

In the interference line method, the resolution is expressed by:

$d = \pi/2 \cdot \sin \rho$ $\rho$ = angle of superposition of the partial beams Furthermore, when using the interference method, the coherence length of the laser irradiation must be larger than the dimensions of a punched card field.

In FIG. 1, (1) denotes the pulsed Excimer laser used, whose beam, through an optical system of lenses (2, 3), into which the shadow mask (4) has been inserted, is directed to the foil (5) being treated.

Figure 2:
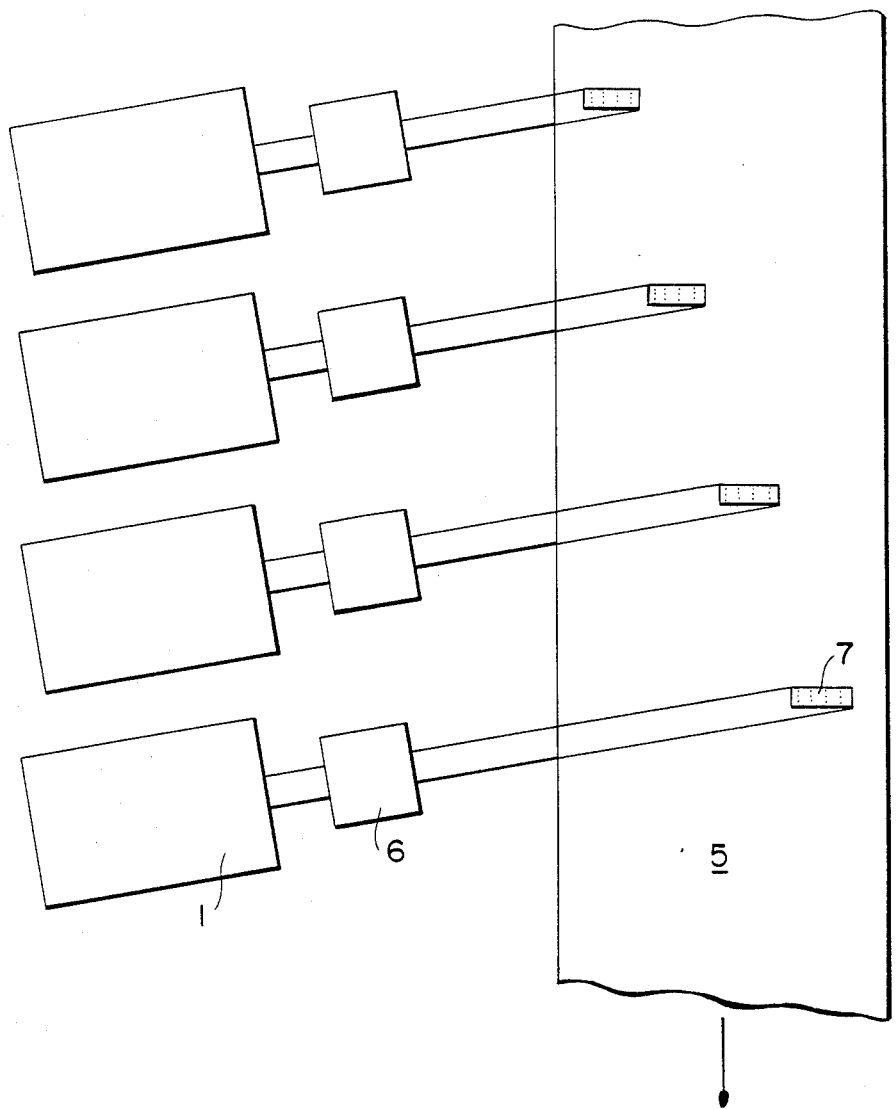
FIG. 2 is a schematic of an arrangement of a plurality of lasers which, spatially staggered at the same time, act on a regularly bounded area of the foil.
Figure 4:
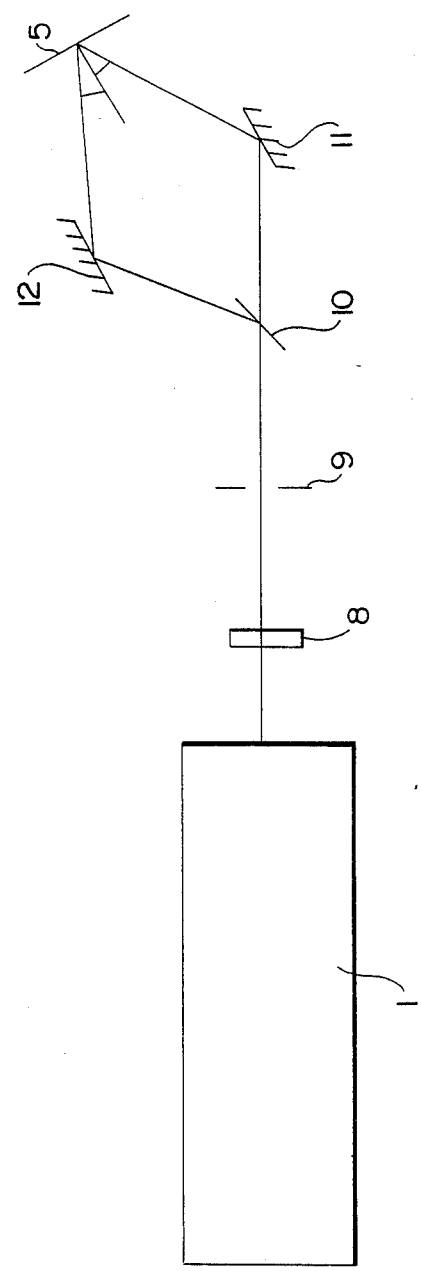
FIG. 4 is a schematic of the optical setup for the erosion of the foil in which intensity modulation is produced by the interference fringe method.

In FIG. 2, the lasers (1) employed have been spatially staggered and, by means of a device (6) that modulates the beam intensity, produce on the foil (5) a pattern of pores (7) in a regularly bounded area. In FIG. 4, a laser (1), a filter (8) and a hole (9) are shown through which the laser beam is directed toward a semitransparent mirror (10) and the mirrors (11) and (12). Depending upon the angle of superposition of the laser beams, interference lines with varying periods are produced on the foil (5).

Figure 6B:
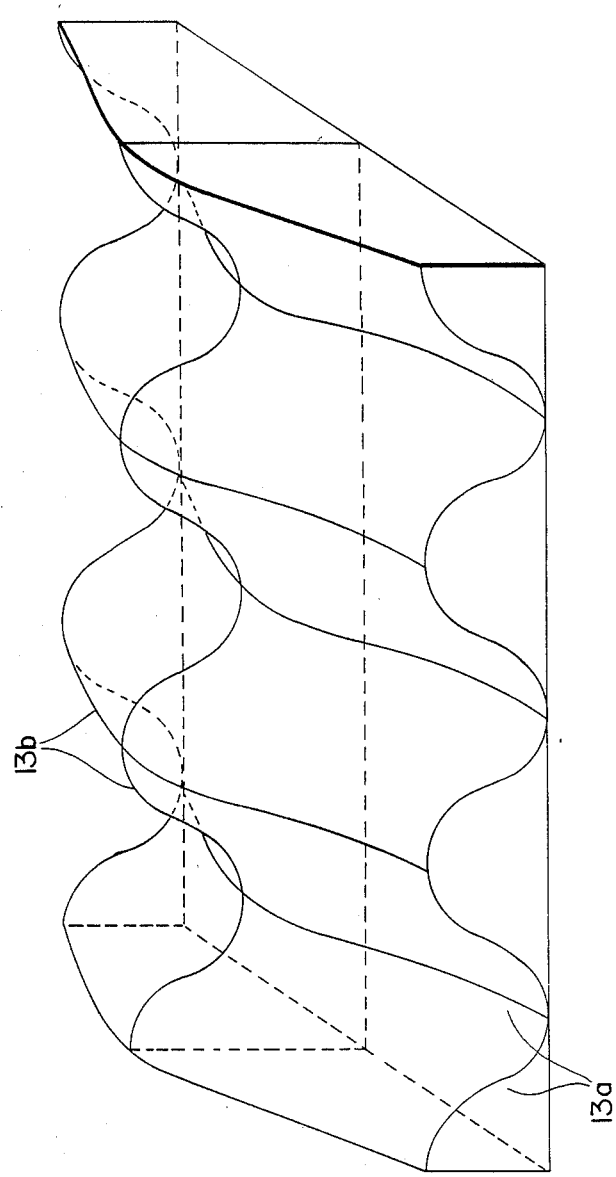
FIG. 6b is a schematic of the segment of the spatial image of the surface structure of the flat membrane produced by crossed interferences. The webs with alternately different heights have been brought out.

In FIGS. 6a and 6b, low-positioned webs are denoted with reference numeral 13a and high-positioned webs with reference numeral 13b.

EXAMPLE 1

A nickel shadow mask (hole diameter 100 μm) is projected onto a polyimide foil 10 cm wide and 10 μm thick (see FIG. 1) by means of a 308-nm irradiation with an XeCl Excimer laser through an optical system of lenses on a 10:1 scale. With an irradiation intensity of 1 J/cm per pulse on the foil, a hole pattern is drilled with 100 pulses. The pulse frequency of the laser is 200 Hz, each pulse lasting about 20 ns.

The hole patterns produced are 2×1 cm large, each individual hole having a diameter of 10 μm.

The polymer foil is transported forward in thrusts of 1 cm/s on a smooth substrate at a constant distance from the laser head.

In order to cover the entire width of the foil, five lasers are operated side by side in identical manner (see FIG. 2).

Figure 3A:
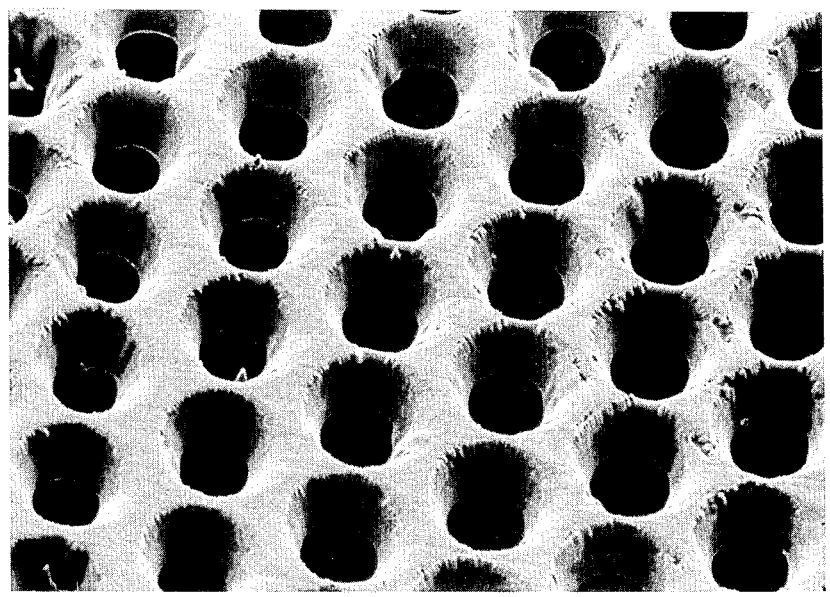
FIG. 3a shows an exposure with a scanning electron microscope of a segment of a pattern of pores of the membrane embodying the invention.
Figure 3B:
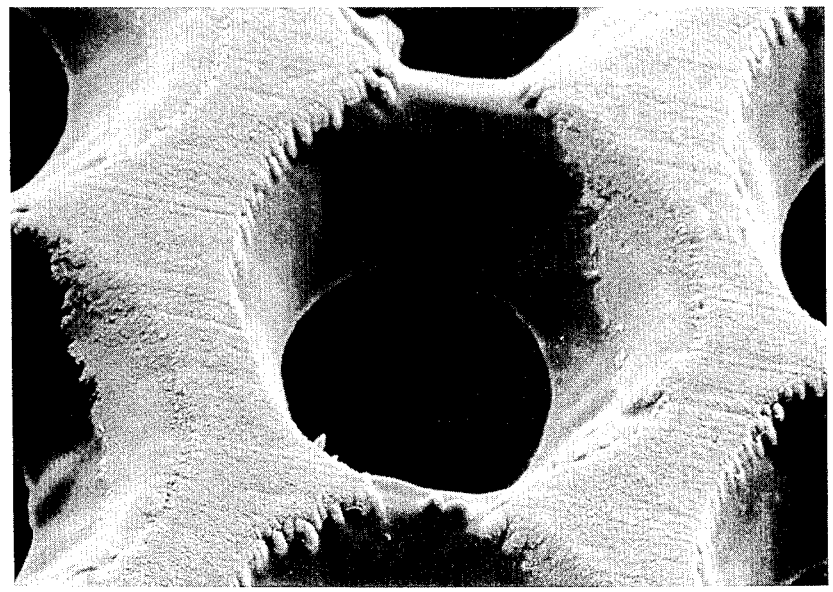
FIG. 3b shows an exposure of a single pore taken with a scanning electron microscope, clearly showing the low height of the transverse ribs.

FIG. 3 shows sections of the pore pattern produced.

EXAMPLE 2

Figure 5:
FIG. 5 shows the segment of a typical fringe-like pattern of interferences.

The beam of a narrow-band KrF Excimer laser ($\lambda$=248 nm, bandwidth=3 GHz) is split into two partial beams and moved in an angular position of 7° for the superimposition (see FIG. 4) on the polyimide pattern foil. The resulting interference lines have a period of about 1 μm (see FIG. 5). With an irradiation intensity of 1J/cm$^2$ per pulse, a pulse lasting 20 ns is applied to etch out a 1×1 cm surface relief from the foil. The material removal is 0.5 μm. In another irradiation position, a second surface relief whose lines are perpendicular to the first ones is etched onto the same location of the foil by means of another pulse from a second laser. At the crossover points, a 1×1 cm field of square material removals, 1 μm deep and 0.5×0.5 μm wide, results at the base of the hole (see FIG. 6).

Advantageously, the membrane foil should be one integral system so as to ensure its mechanical stability. It is comprised of a substrate with relatively large pores (e.g., perforated metal foil with holes >100 μm) to which a 1 μm polyimide layer is applied. Thus, in accordance with the above process, passages of 0.5×0.5 μm result in the polyimide layer.

For continuous processing, the combined foil is transported forward at a speed of 2 cm/0.1 s on a smooth surface and spaced a constant distance from the laser head. The pulse frequency of the lasers is 20 Hz. Again, in order to irradiate the entire foil width, a plurality of lasers are operated in parallel.

What is claimed is:

1. A flat membrane comprising a foil of organic polymers, glass or ceramic materials, with pores formed by at least one pulsed laser tapering in funnel-shaped fashion, and having a fixed pore size and a pore size distribution of less than 10% and an arrangement of the pores in a pattern of adjacent rows sufficient to provide a clear separation limit, wherein average diameters of said pores range from 0.05 to 10 μm and the pore patterns are evenly arranged in a regularly bounded area and have, between the individual pores, remaining ribs with varying heights in a direction of a thickness of the foil material sufficient to permit underwashing of retained parts of a filtered medium.

2. A flat membrane as set forth in claim 1, wherein the regularly bounded area is a square.

3. A flat membrane as set forth in claim 1, wherein the regularly bounded area is a rectangle.

4. A flat membrane as set forth in claim 1, wherein the regularly bounded area is a circle.

5. A flat membrane as set forth in claim 1, wherein the ribs are arranged with varying heights parallel in one direction.

6. A flat membrane as set forth in claim 1, wherein the ribs which are disposed perpendicularly to each other have alternately varying heights.

7. A flat membrane as set forth in claim 1, wherein the flat membrane is installed on a coarse-pored support material.

8. A process for manufacturing a flat membrane from a foil of organic polymers, glass or ceramic materials, comprising eroding pores in said membrane with at least one pulsed laser and continuously transporting the foil past said at least one laser, wherein a uniformly spatially intensity-modulated laser beam bounded by a regular area is pulsed onto the foil with a pulse duration ranging from 1 to 100 nanoseconds said membrane being sufficient to provided a clear separation limit, said pores being separated by ribs which are capable of providing underwashing of retained parts of a filtered medium.

9. A method as set forth in claim 8, wherein the uniform spatial intensity modulation is generated by crossed interference lines.

10. A method as set forth in claim 8, wherein the uniform spatial intensity modulation is generated by optical image formation of a shadow mask.

11. A method as set forth in claim 8, wherein the foil is mounted onto a coarse-pored support system prior to radiation with lasers.

12. A method as set forth in claim 8, wherein said foil further comprises a thin metal foil and the metal foil is provided with coarse-pored openings prior to or after said eroding step.

* * * * *

UNITED STATES PATENT AND TRADEMARK OFFICE
CERTIFICATE OF CORRECTION

PATENT NO. : 4,923,608
DATED : May 8, 1990
INVENTOR(S) : Thomas FLOTTMANN et al

It is certified that error appears in the above-identified patent and that said Letters Patent is hereby corrected as shown below:

Column 5, line 1, change "$d = \pi/2 \cdot \sin\rho$" to --$d = \lambda/2 \cdot \sin\rho$--.

Signed and Sealed this

Thirteenth Day of August, 1991

Attest:

HARRY F. MANBECK, JR.

Attesting Officer

Commissioner of Patents and Trademarks